Patented June 17, 1930

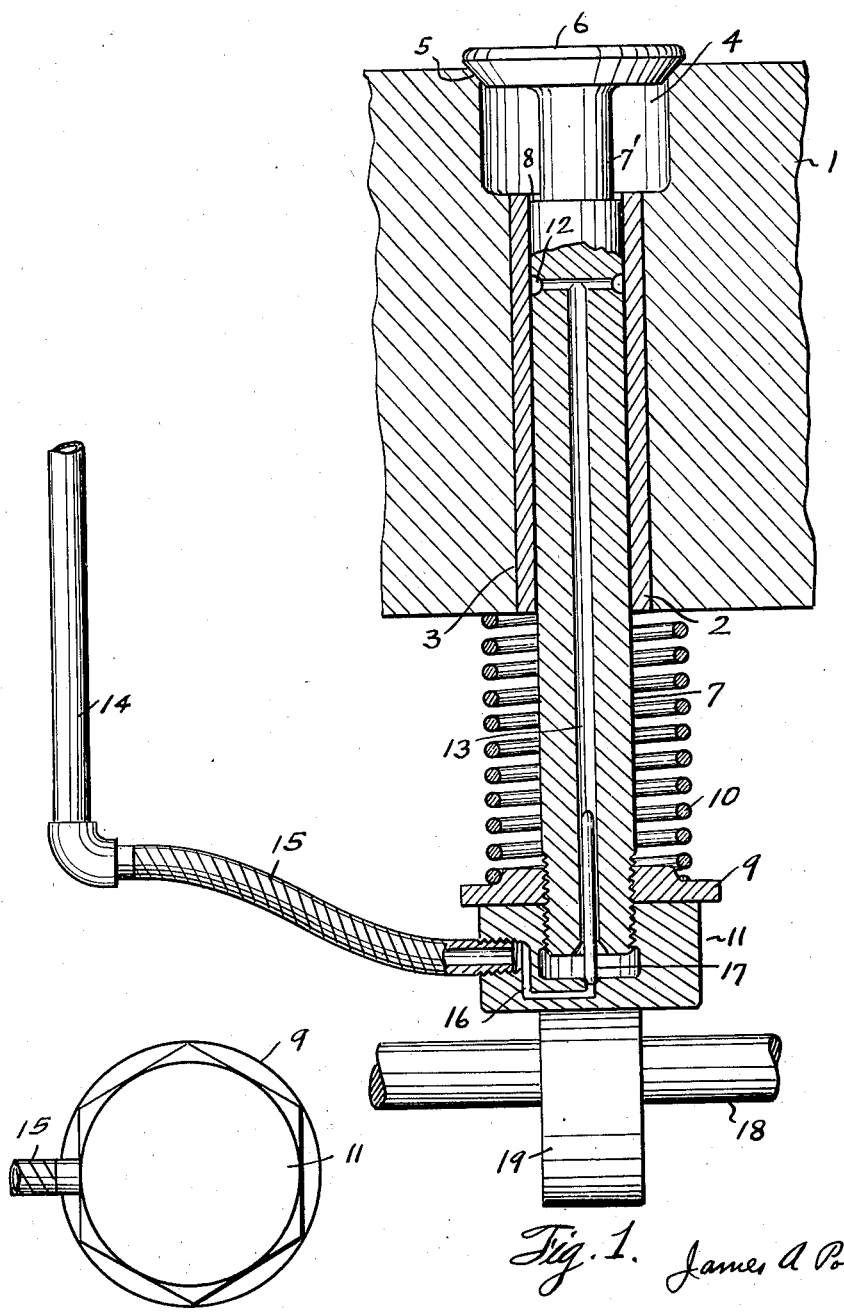

1,764,467

UNITED STATES PATENT OFFICE

JAMES A. PORTIS, JR., OF BAYTOWN, TEXAS

INTERNAL-COMBUSTION MOTOR

Application filed March 6, 1928. Serial No. 259,411.

This invention relates to new and useful improvements in an internal combustion motor.

One object of the invention is to provide, in an internal combustion motor, novel means for lubricating the motor valve stems.

Another object of the invention is to provide a novel type of valve stem of such formation as to prevent carbon from collecting on the stem and to reduce the wear, of the stem, to a minimum.

With the above and other objects in view this invention has particular relation to certain novel features of construction, operation and arrangement of parts an example of which is given in this specification and illustrated in the accompanying drawings wherein:—

Figure 1 shows a fragmentary sectional view of an internal combustion motor showing the valve and valve stem thereof, and Figure 2 shows an end view of the stem.

Referring now more particularly to the drawings, wherein like numerals of reference designate similar parts in each of the figures the numeral 1 designates the motor head having a guide bushing 2 fitted through the bore 3 of said head. The inner end of the bore is enlarged forming the gas chamber 4 whose inner end is flared forming the valve seat 5 with which the valve 6 cooperates. Fixed to the valve 6 there is a stem 7 which works through the bushing 2 and fits closely therein.

That portion 7' of the stem within the chamber 4 is reduced, forming the annular shoulder 8, which, when the valve is closed, is slightly within the adjacent end of the bushing 2.

Threaded onto the outer end of the stem 7 there is a nut 9 and interposed between this nut and the motor head, and surrounding said stem, is a coil spring 10, which normally holds the valve 6 closed. A jamb nut 11 is threaded over the outer end of the stem 7 and locks the nut 9 against unscrewing.

Within the bushing 2 there is a peripheral groove 12 around the stem which communicates with the inner end of an axial bore 13 which extends to the outer end of the stem.

A lubricant is admitted, from a suitable source of supply, through the supply pipe 14, and the flexible tube 15, and through the channel 16, in the nut 11, into the bore 13 and passes thence into the groove 12.

There is a floating plunger 17 in the bore 13, which is slightly less, in diameter, than said bore. This plunger moves back and forth, in said bore, as the pressure varies, and prevents said bore from becoming clogged, and at the same time prevents too free a flow of the lubricant to the groove 12.

There is a cam shaft 18 on which the cam 19 is fixed. This cam rides against the outer end of the nut 11 and opens the valve 6 successively as the cam rotates.

With each opening of the valve the sharp outer corner, or angle, of the shoulder 8 will cut away and remove the carbon that collects about the adjacent end of the bushing 2 and prevents carbon from finding its way between said bushing and stem and thus minimizes the wear on the stem due to the presence of such carbon.

What I claim is:—

1. In combination a valve and a valve stem bearing; a stem attached to the valve and having a peripheral groove within said bearing and an axial bore leading from said groove, means for constantly supplying a lubricant to said bore, and a floating plunger in the bore and movable from end to end thereof.

2. In combination a valve and a valve stem bearing; a stem attached to the valve and working through said bore and having a peripheral groove in said bearing around the stem, said stem also having a longitudinal bore communicating with said groove, an outside lubricant conducting tube connected into said bore and provided to supply a lubricant thereto and a floating plunger in said bore and movable from end to end thereof.

3. In combination a valve and a valve stem bearing; a stem attached to the valve and working through said bearing, said stem having a peripheral groove with in the bearing and having a bore leading from said groove to the end of the stem remote from the valve, a nut threaded onto said last mentioned end of said stem, a channel through said nut which connects with said bore and an outside lubricant conducting tube connected into said channel.

In testimony whereof I have signed my name to this specification.

JAMES A. PORTIS, Jr.